United States Patent [19]

Steadman

[11] 4,317,424
[45] Mar. 2, 1982

[54] TORQUE LIMITER TRIP INDICATOR

[75] Inventor: Stephen T. Steadman, Redmond, Wash.

[73] Assignee: The Boeing Company, Seattle, Wash.

[21] Appl. No.: 160,890

[22] Filed: Jun. 19, 1980

[51] Int. Cl.³ .............................................. B60Q 1/26
[52] U.S. Cl. .................................... 116/56; 116/294; 116/324
[58] Field of Search ................... 116/56, 28, 294, 324

[56] References Cited

U.S. PATENT DOCUMENTS

| 691,639 | 1/1902 | Kuntzen | 116/294 |
|---|---|---|---|
| 1,003,391 | 9/1911 | Barber et al. | 200/162 |
| 1,074,955 | 10/1913 | Kavanagh | 116/303 |
| 1,219,896 | 3/1917 | Yanert | 116/303 |
| 1,743,294 | 1/1930 | Tracy et al. | 116/294 |
| 1,752,236 | 3/1930 | Conklin | 200/162 |
| 2,293,698 | 8/1942 | Chaput | 116/303 |
| 2,413,414 | 12/1946 | Obermaier | 116/303 |
| 2,418,727 | 4/1947 | Rosenston et al. | 116/303 |
| 2,436,906 | 3/1948 | Svoboda | 200/162 |
| 2,553,226 | 5/1951 | Myers | 116/313 |
| 3,099,243 | 7/1963 | Schwartz et al. | 116/56 |
| 3,129,989 | 4/1964 | Myers | 116/303 |
| 3,221,705 | 7/1965 | Saviskas | 116/313 |
| 3,786,778 | 1/1974 | Palmer | 116/313 |
| 3,911,857 | 10/1975 | Manuel | 116/313 |
| 4,000,388 | 12/1976 | Carter et al. | 200/162 |

Primary Examiner—Robert I. Smith
Attorney, Agent, or Firm—James P. Hamley; Bernard A. Donahue

[57] ABSTRACT

A pivotal crank is positioned with respect to the output cam of a torque limiter such that upon torque limiter operation the resulting translation of the cam pivots the crank. Attached to the crank is a flag arm which is normally retained by a spring clip. Pivotal motion of the crank causes disengagement of the flag arm from the spring clip thereby indicating torque limiter operation. The flag arm remains in the disengaged position, despite subsequent absence of limiter operation, until it is manually reset.

5 Claims, 5 Drawing Figures

U.S. Patent     Mar. 2, 1982     4,317,424
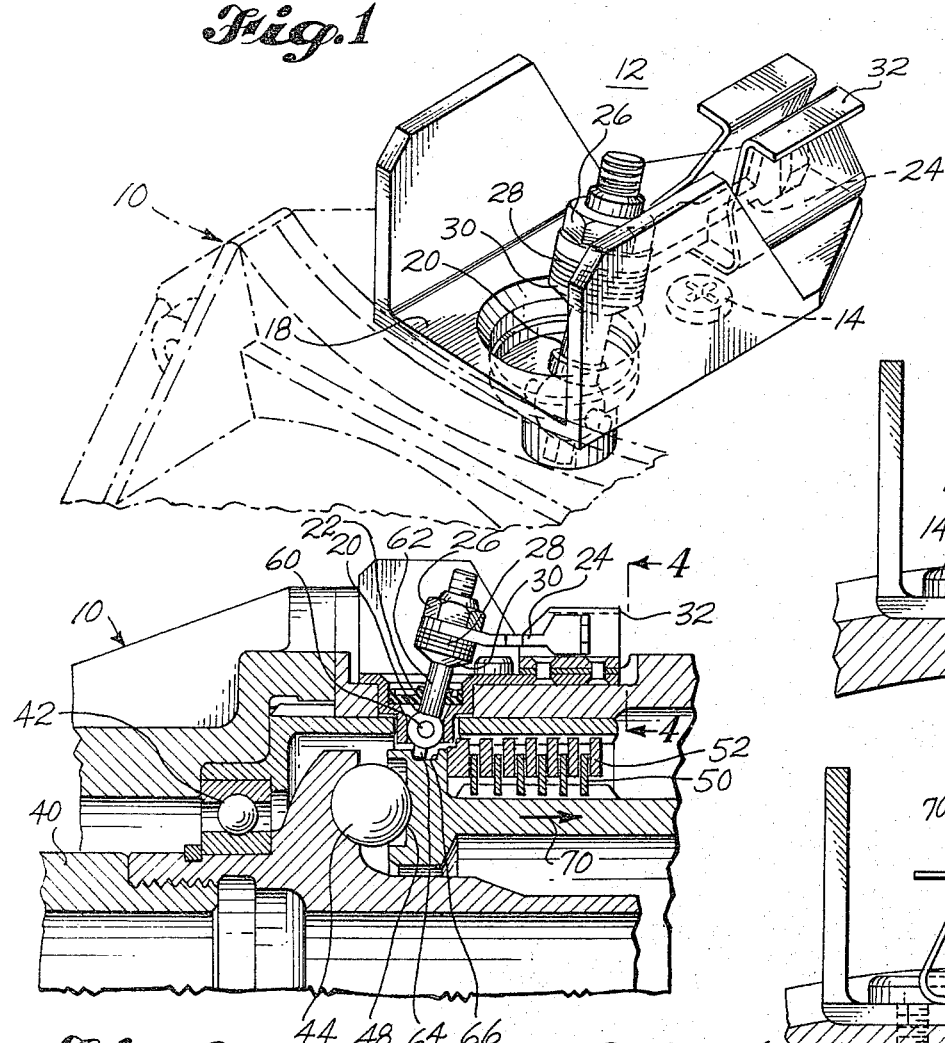
Fig. 1
Fig. 2
Fig. 3
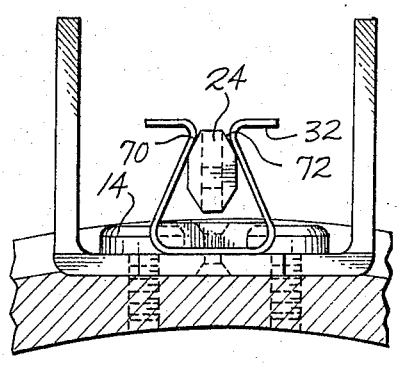
Fig. 4
Fig. 5

TORQUE LIMITER TRIP INDICATOR

BACKGROUND OF THE INVENTION

The present invention pertains to the indicator art and, more particularly, to a means for indicating slight movements of a mechanical member.

The prior art is replete with mechanical indicating systems. Patents have issued for systems indicating that a booth is occupied, a fish is on a line, a water skier has fallen and so forth. However, none of the prior art mechanical indicating systems has provided a solution to a particular problem, an example of which is found in the aircraft art.

In commercial aviation transports, the flaps are deployed as a result of a torque being coupled to a gear box. The torque is normally supplied from a drive motor which is capable of driving a number of gear boxes. If one of the flaps should become jammed, as by icing or any one of numerous other causes, the force coupled to it could easily damage the flap and, possibly, a significant portion of the wing surface. To prevent such damage, the prior art has provided a device known as a torque limiter between the torque source and the gear box. In operation, the torque limiter couples the torque from the source through an input cam plate, series of steel balls and an output cam plate to the gear box. Each steel ball is located between input and output cam plates and rides in a dished cutout of the latter. If the torque required to rotate the output cam plate exceeds a predetermined value, the steel balls ride up onto the ridge portion of the dished cutouts. This results in a force which drives the output cam plate away from the input cam plate causing brake disks mounted thereon to forcibly engage stator disks which are coupled through the torque limiter housing to the aircraft main frame. Thus, torque from the torque source is effectively grounded and destructive forces are deflected from reaching the jammed flap.

During the course of a flight, one or more flaps may fail to be deployed in response to a pilots command. Not uncommonly, once the aircraft lands the flaps are operating properly and, as such, it is difficult if not impossible for the ground crew to identify the source of the problem. That is, it is not known whether the failure for the flaps to respond was a result of an intermittent drive motor, a linkage problem, failure of the gear box or jamming of the flaps, i.e. a failure upstream or downstream of the torque limiter.

As a diagnostic aid it would be useful to know whether or not during the flight the torque limiter was tripped. If it was, this is an indication that the failure occurred downstream from the torque limiter, i.e. at the gear box, flap or linkage therebetween. Thus, it would be desirable to provide a torque limiter trip indicator which would indicate to the ground crew whether or not torque limiter tripping had occurred.

The constraints imposed on such a torque limiter indicator are both numerous and stringent. Such an indicator must mount to an existing torque limiter without extensive limiter modification. Further, since there is only slight relative movement of limiter parts during its transition to and from the limiting action mode, an indicator must be capable of providing a positive, reliable limiter trip indication in response to very slight mechanical movements. In addition, the trip indicator must provide permanent witness to the condition of torque limiting even though the torque in the system may thereafter return to a normal condition. Beyond this, the limiter must be capable of being reset, as by the ground crew.

SUMMARY OF THE INVENTION

It is an object of this invention, therefore, to provide an improved mechanical indicator which is capable of producing an indication of a very slight mechanical movement of a member from its normal position.

It is a further object of the invention to provide the above described improved mechanical indicator which once activated remains in its activated state despite the subsequent return of the mechanical member to its normal state.

It is a further object of the invention to provide means to reset the mechanical indicator once the event has been witnessed.

It is a particular object of the invention to provide the above described improved mechanical indicator for application as a trip indicator in a torque limiter.

Briefly, an indicator mechanism provides an indication of a relatively slight movement of a member, the indication being continuous until the indicator mechanism is reset. The indicator mechanism includes a pivoting crank having a relatively short and a relatively long arm as measured from the pivot. The crank is positioned with the crank short arm in contacting relationship with the member such that movement of the member produces a corresponding deflection of the short arm and, thereby, an amplified deflection of the long arm. A flag arm extends from the long arm for movement therewith. A retainer is fixedly mounted with respect to the pivoting crank and is positioned to engage and retain the flag arm upon reset of the indicating mechanism. The flag arm and retainer cooperate such that movement of the lever as amplified through the pivoting crank results in the flag arm disengaging from the retainer until such time that the flag arm is forcibly reset.

BRIEF DESCRIPTION OF THE DRAWINGS

FIG. 1 is an isometric view of the torque limiter trip indicator shown mounted to the limiter housing;

FIG. 2 is a cross sectional view of the torque limiter and indicator mechanism wherein the indicator is in its reset position;

FIG. 3 is a cross sectional view of the torque limiter and indicator illustrating the indicator in its trip limit position; and FIGS. 4 and 5 are plan views illustrating cooperation between the indicator flag arm and spring clip retainer.

DETAILED DESCRIPTION OF THE PREFERRED EMBODIMENT OF THE INVENTION

FIG. 1 is a partial view of an aircraft torque limiter housing 10 showing the indicator mechanism, indicated generally at 12 mounted thereon. Torque limiters are well known in the art and, while a more detailed description of torque limiter operation is discussed with respect to FIGS. 2 and 3, the basic function of a torque limiter is to couple torque from input to output unless torque above a predefined limit is required to drive the output. Should excessive torque be required, the system operates to ground the input torque, thereby preventing any torque transfer to the output.

The particular application for a torque limiter as shown in FIG. 1 is that of coupling torque from an aircraft motor actuator to a gear box which, in turn, deploys one or more wing flaps. If a flap should become jammed, such as due to icing, it would begin to receive an excessive amount of torque from the motor actuator. This might result in bending of the flap, flap support linkage, or of associated wing structure. Thus, to prevent this condition a torque limiter is placed between the motor actuator and the flap gear box. If the limiter senses that an excessive amount of torque is required to drive the output, the input torque is grounded, in a manner discussed more thoroughly with respect to FIG. 2, to the aircraft main frame, thus preventing the above described failure mechanism.

On occasion, certain flaps have failed to deploy upon pilot command during a landing approach whereas once the plane is on the ground the system operates flawlessly. In such a situation, it is not known whether the motor actuator, connecting linkage, torque limiter, gear box or the flap itself was responsible for the failed deployment. As such, trouble shooting has been quite difficult.

The present invention is directed to an indicator which continuously discloses, until reset, tripping of the torque limiter. Thus, in the situation discussed above, when the flaps fail to operate in the air but operate properly on the ground, if the ground crew can identify that the torque limiter did in fact trip, this is an indication that the system failure occurred after the torque limiter. Such an indication significantly improves the ability of maintenance personnel to locate and correct a faulty component in the system.

The indicator mechanism 12 mounts to the existing torque limiter housing 10 via mounting screws, such as screw 14 through the indicator mechanism mounting plate 18.

An indicator pivoting crank 20 extends through a hole provided in the housing 10 (see FIG. 2) sealed by an elastomer boot 22 which prevents the ingress of moisture or debris into the pivot area.

Extending from the pivot crank 20 is a flag arm 24. Flag arm 24 is secured to the pivoting crank 20 by an adjusting screw 26 which compresses the lever arm against a series of shims 28 and up against a crank collar 30.

The flag arm 24, at its extension, is normally retained by a spring clip 32. The spring clip, which is shown more clearly in FIG. 4, holds the flag arm in place until such time that pivoting of the crank 20 results in release of the flag arm. Thereafter, the spring clip 32 maintains the arm in its disengaged condition until it is manually reset.

FIG. 2 is a cutaway side view of a portion of the torque limiter and the indicator mechanism.

The torque limiter operates by coupling an input torque applied to an input cam 40, which rides on a bearing race 42, through several circumferentially located steel balls, such as ball 44, to an output cam 46. Each ball, such as steel ball 44, rides in a dish shaped cutout 48 provided in the output cam plate 46. A series of torque limiter brake disks, one of which is shown at 50, are physically connected to the output cam plate 46. These brake disks, such as disk 50 ride in proximity to a series of stator disks, one of which is indicated at 52.

During normal operation of the torque limiter, i.e. the limiter is not tripped, input torque at input torque plate 40 is passed without slippage through the steel balls, such as steel ball 44 and to the output cam plate 46 with the stator disks, such as disk 52, moving freely with respect to the torque limiter brake disks, such as brake 52.

The preferred embodiment of the present indicator mechanism as shown in FIG. 2 includes a pivoting crank 20 which pivots about a pivot point 60. Pivot 60 may be either a pivot pin or a needle bearing. The pivot crank 20 has a relatively long arm portion 62, which extends out of a provided hole in the limiter housing 10 and a relatively short arm portion 64 which extends into a slot 66 provided in the output cam 46.

A flag arm 24 is secured to the pivoting crank 20 by an adjusting nut 26 which compresses the flag arm 24 through a set of shims 28 to a crank collar 30. The angular location of the flag arm about the logitudinal axis of the pivoting crank is provided by a "D" slot in the flag arm.

The extension of flag arm 24 is shown in its reset position, as secured by a spring clip retainer 32.

As is shown in detail with respect to FIG. 3, when the torque limiter is tripped there is a translation of the output cam plate 46 in the direction shown by arrow 70. This is a very small movement and, as such, tolerances of the parts in the mechanism, along with tolerances of the total assembly must be accounted for to insure proper indicator mechanism operation. Thus, the adjusting nut 26 in cooperation with the shims 28 provide a convenient means for adjusting the position of crank 20 such that the flag arm 24 is secured in the spring clip retainer 32 for the no trip limiter condition and that the short arm 64 is a predetermined distance from engaging the edge of slot 66.

FIG. 3 illustrates tripping of the torque limiter and corresponding actuation of the indicator mechanism. Here, due to excessive resistance in the torque output plate 46, the steel ball 44, as well as the other balls in the system which are not shown in the figure, rides up into the lip of the dish portion 48. This causes a translation of the output cam plate 46 in the direction indicated by arrow 70. Thus, each torque limiter brake disk, such as disk 50 frictionally engages an associated stator disk, such as stator disk 52. The net result is that the torque applied to the input torque cam plate 40 is transmitted through the torque limiter brake disks and stator disks to the housing 10 which is fixedly mounted to the aircrafts main frame. Thus, the input torque is effectively grounded, thereby preventing damage to a flap or other device which is ultimately connected to the torque limiter output cam plate 46.

The translation of output cam plate 46 causes a deflection of short arm 64 which pivots pivoting crank 20 and creates an amplified motion at pivoting crank long arm 62. This amplified motion results in flag arm 24 disengaging the spring clip 32 whereby the flag is raised to a trip indicate position, as shown. Due to the design of the spring clip and flag arm extension, which is shown more fully in FIGS. 4 and 5, the flag arm 24 will continuously stay in the trip indicating position, despite subsequent return of the torque limiter to its untripped state, until the flag arm is manually reset into the spring clip 32. Thus, if, for example, the torque limiter is tripped during flight, the flag arm is actuated to, and remains in its extended position until it is manually reset by the ground crew. As is described above, such an indicating mechanism provides a useful diagnostic aid in attempting to isolate a transient failure problem in a flap deployment.

FIG. 4 is an end view of the flag arm 24 shown in its cooperation with the spring clip retainer 32. As shown, the spring clip 32 is provided with a pair of engaging surfaces 70, 72 which, in their rest position, would be biased to resist insertion of the flag arm 24.

The flag arm 24 has curved mating faces 74, 76 contoured such that when the flag arm is forcibly reset, the contoured surfaces 74, 76 engage and spread the spring engaging surfaces 70, 72 until the spring bias physically pulls and holds the flag arm into its reset position.

Upon tripping of the torque limiter the crank 20, and flag arm 24 pivot up out of the spring clip 32 until it reaches the position shown in FIG. 5. At this point, the compressing force exerted by spring clip 32 actively drives the flag arm out of engagement with the spring clip, thus amplifying the motion of the flag arm and enhancing the visibility of the flag. Once the flag arm 24 is out of the spring clip 32, the spring bias of engaging surfaces 70, 72 prevents the flag arm from being retained by the spring clip 32 even though the torque limiter has returned to its untripped position. Thus, only a forcible resetting of the flag arm 24 will cause the arm to return to its reset location.

In summary, the present indicating mechanism is capable of responding to slight movements of a member, such as the output cam plate of a torque limiter, for making a continuous indication of member movement until resetting of the mechanism.

While a preferred embodiment of the invention has been described in detail, it should be apparent that many modifications and variations thereto are possible, all of which fall within the true spirit and scope of the invention.

I claim:

1. An indicator mechanism for providing an indication of a relatively slight movement of a member, said indication being continuous until the indicator mechanism is reset, the indicator mechanism comprising:

a pivoting crank means having a relatively short and a relatively long arm as measured from the pivot, said crank being predeterminedly positioned with said crank short arm being in a predetermined spaced relationship with said member such that movement of said member produces a corresponding deflection of the short arm thereby producing an amplified deflection of said long arm;

a flag arm extending from said long arm for movement therewith; and a retainer fixedly mounted with respect to said pivoting crank and positioned to engage and retain said flag arm upon reset of the indicating mechanism, the flag arm and retainer cooperating such that movement of said lever as amplified through said pivoting crank causes said flag arm to remove from and disengage said retainer until such time that the flag arm is forcibly reset.

2. The indicator mechanism of claim 1 wherein said flag arm is secured to said long arm by provided adjusting means which allows adjustment of said flag arm with respect to said long arm such that the flag arm may be adjusted to assure its being retained by said retainer while said short arm is at a predetermined distance from engaging said member despite a tolerance spread of the mechanism's components.

3. The mechanism of either of claims 1 or 2 wherein said retainer is comprised of a spring clip having spring biased engaging surfaces arranged for normally excluding engagement of said flag arm unless a sufficient resetting force is applied to the flag arm to overcome said spring bias, and wherein the contour of the retainer engaging faces of the flag arm are such that upon sufficient movement of the flag arm out of engagement with said retainer, said retainer spring clip retaining surfaces exert a disengaging force on the flag arm.

4. The mechanism of either of claims 1 or 2 wherein said member is the output cam plate of a torque limiter mechanism.

5. The mechanism of claim 3 wherein said member is the output cam plate of a torque limiter mechanism.

* * * * *